(12) United States Patent
Ashworth et al.

(10) Patent No.: US 11,012,143 B2
(45) Date of Patent: *May 18, 2021

(54) DESKTOP SIGNAL BOOSTER

(71) Applicant: WILSON ELECTRONICS, LLC, St. George, UT (US)

(72) Inventors: Christopher Ken Ashworth, St. George, UT (US); Michael James Mouser, Parker, TX (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,345

(22) Filed: Dec. 31, 2018

(65) Prior Publication Data

US 2019/0140734 A1 May 9, 2019

Related U.S. Application Data

(62) Division of application No. 15/814,223, filed on Nov. 15, 2017, now Pat. No. 10,348,392.

(60) Provisional application No. 62/422,505, filed on Nov. 15, 2016.

(51) Int. Cl.
| | |
|---|---|
| *H04B 7/155* | (2006.01) |
| *H02J 7/00* | (2006.01) |
| *H02J 7/35* | (2006.01) |
| *H02J 7/02* | (2016.01) |

(52) U.S. Cl.
CPC ..... *H04B 7/15535* (2013.01); *H04B 7/15571* (2013.01); *H02J 7/00034* (2020.01); *H02J 7/0044* (2013.01); *H02J 7/025* (2013.01); *H02J 7/35* (2013.01)

(58) Field of Classification Search
CPC ............. H04B 7/15535; H04B 7/15571; H02J 7/0044; H02J 7/35; H04J 7/025
See application file for complete search history.

(56) References Cited

U.S. PATENT DOCUMENTS

| | | |
|---|---|---|
| 4,445,118 A | 4/1984 | Taylor et al. |
| 4,776,032 A | 10/1988 | Odate et al. |
| 5,303,395 A | 4/1994 | Dayani |

(Continued)

FOREIGN PATENT DOCUMENTS

| | | |
|---|---|---|
| EP | 1525678 B1 | 7/2008 |
| KR | 101488743 B1 | 2/2015 |

(Continued)

OTHER PUBLICATIONS

3GPP2 C.S0011-B; "Recommended Minimum Performance Standards for cdma2000® Spread Spectrum Mobile Stations;" TIA-98-E; (Dec. 13, 2002); 448 pages; Release B, Version 1.0, Revision E.

(Continued)

*Primary Examiner* — Dominic E Rego
(74) *Attorney, Agent, or Firm* — Thorpe North & Western

(57) ABSTRACT

Technology for a signal repeater is disclosed. The signal repeater can include a cellular signal amplifier configured to amplify signals for a wireless device. The signal repeater can include an integrated satellite transceiver coupled to the cellular signal amplifier and configured to communicate signals to one or more satellites. The integrated satellite transceiver can be used when cellular signals are unavailable.

20 Claims, 11 Drawing Sheets

(56) References Cited

U.S. PATENT DOCUMENTS

| | | | |
|---|---|---|---|
| 5,737,687 A | 4/1998 | Martin et al. | |
| 5,777,530 A | 7/1998 | Nakatuka | |
| 5,835,848 A | 11/1998 | Bi et al. | |
| 5,937,332 A | 8/1999 | Karabinis | |
| 6,005,884 A | 12/1999 | Cook et al. | |
| 6,208,202 B1 | 3/2001 | Kaufman et al. | |
| 6,313,698 B1 | 11/2001 | Zhang et al. | |
| 6,487,419 B1 | 11/2002 | Freed | |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,408,898 B1 | 8/2008 | Brown | |
| 7,974,573 B2 | 7/2011 | Dean | |
| 8,583,033 B2 | 11/2013 | Ashworth et al. | |
| 8,818,292 B1 | 8/2014 | Ashworth et al. | |
| 10,009,049 B2 * | 6/2018 | Klopfer | H04B 1/0458 |
| 2002/0044594 A1 | 4/2002 | Bongfeldt | |
| 2002/0072339 A1 | 6/2002 | Hamalainen | |
| 2003/0123401 A1 | 7/2003 | Dean | |
| 2004/0087334 A1 | 5/2004 | Nishiyama | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0198237 A1 | 10/2004 | Abutaleb et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2005/0215204 A1 | 9/2005 | Wallace et al. | |
| 2005/0227619 A1 | 10/2005 | Lee et al. | |
| 2006/0058029 A1 | 3/2006 | Lee et al. | |
| 2006/0084379 A1 | 4/2006 | O'Neill | |
| 2006/0148401 A1 * | 7/2006 | Roper | H04B 7/15535 455/11.1 |
| 2006/0172781 A1 * | 8/2006 | Mohebbi | H04B 7/15535 455/571 |
| 2007/0001766 A1 * | 1/2007 | Ripley | H03F 1/0261 330/279 |
| 2007/0071128 A1 | 3/2007 | Meir et al. | |
| 2007/0188235 A1 | 8/2007 | Dean | |
| 2007/0197207 A1 | 8/2007 | Carstens et al. | |
| 2007/0201402 A1 | 8/2007 | Cho et al. | |
| 2007/0291668 A1 | 12/2007 | Duan | |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2009/0077608 A1 | 3/2009 | Romerein et al. | |
| 2009/0091663 A1 | 4/2009 | Toh et al. | |
| 2009/0201201 A1 * | 8/2009 | Foster | G06Q 10/08 342/357.75 |
| 2009/0207776 A1 | 8/2009 | Baik et al. | |
| 2009/0253385 A1 | 10/2009 | Dent et al. | |
| 2010/0234071 A1 | 9/2010 | Shabtay et al. | |
| 2010/0321114 A1 | 12/2010 | Okada et al. | |
| 2011/0151775 A1 | 6/2011 | Kang et al. | |
| 2012/0013296 A1 | 1/2012 | Heydari et al. | |
| 2012/0309293 A1 | 12/2012 | Kummetz et al. | |
| 2013/0121505 A1 | 5/2013 | Duraiswami et al. | |
| 2013/0149957 A1 * | 6/2013 | Desclos | H04B 7/15 455/11.1 |
| 2013/0195467 A1 | 8/2013 | Schmid et al. | |
| 2013/0210465 A1 | 8/2013 | Poe et al. | |
| 2013/0242852 A1 | 9/2013 | Petros | |
| 2014/0015642 A1 | 1/2014 | White | |
| 2014/0065949 A1 | 3/2014 | Wilhite | |
| 2014/0370887 A1 * | 12/2014 | Wyler | H04W 36/14 455/427 |
| 2015/0009889 A1 | 1/2015 | Zhan | |
| 2015/0011157 A1 | 1/2015 | Terry | |
| 2015/0214904 A1 | 7/2015 | Lozhkin | |
| 2016/0126625 A1 * | 5/2016 | Gurewitz | H01Q 3/02 342/353 |
| 2016/0141908 A1 | 5/2016 | Jakl et al. | |
| 2016/0181984 A1 | 6/2016 | Petrucelli et al. | |
| 2016/0198347 A1 | 7/2016 | Zhan | |
| 2016/0315653 A1 | 10/2016 | Saji et al. | |
| 2017/0077592 A1 | 3/2017 | Tsai et al. | |
| 2017/0093374 A1 | 3/2017 | Yatsenko et al. | |
| 2017/0094608 A1 | 3/2017 | Langer et al. | |
| 2017/0206329 A1 * | 7/2017 | Capocasale | G06F 19/3418 |
| 2018/0041234 A1 | 2/2018 | Klopfer et al. | |

FOREIGN PATENT DOCUMENTS

| | | |
|---|---|---|
| WO | WO 2008/156489 A1 | 12/2008 |
| WO | WO 2009046228 A1 | 4/2009 |

OTHER PUBLICATIONS

ADL5513; "1 MHz to 4 GHz, 80 dB Logarithmic Detector / Controller;" Data Sheet; (2008); 25 pages.

HMC713LP3E; "54 dB, Logarithmic Detector / Controller, 50—8000 MHz;" Data Sheet; (2010); 12 pages.

HMC909LP4E; "RMS Power Detector Single-Ended, DC—5.8 GHz;" Data Sheet; (2010); 21 pages.

PIC16F873; "28/40-Pin 8-Bit CMOS FLASH Microcontrollers;" Data Sheet; (2001); 218 pages.

European Partial Supplementary Search Report Application No. 17871123.0-1220, dated May 14, 2020, 15 Pages.

* cited by examiner

DESKTOP SIGNAL BOOSTER

RELATED APPLICATIONS

The present application is a divisional application of U.S. patent application Ser. No. 15/814,223 filed Nov. 15, 2017, which claims the benefit of U.S. Provisional Patent Application No. 62/422,505, filed Nov. 15, 2016, the entire specifications of which are hereby incorporated by reference in their entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
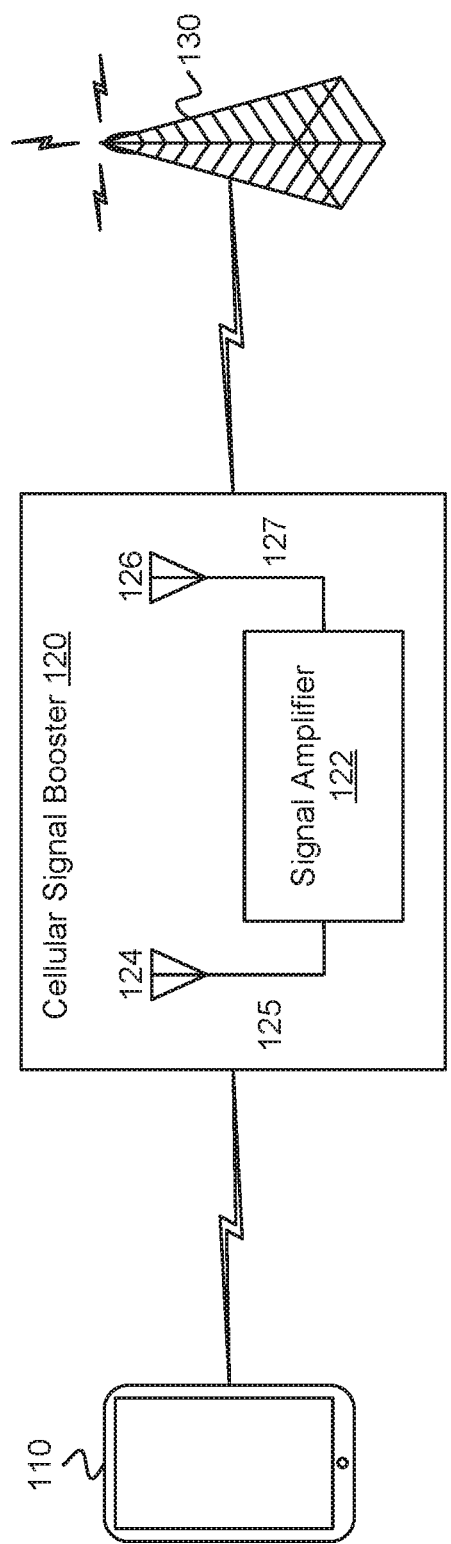
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (2016-10).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

Figure 2:
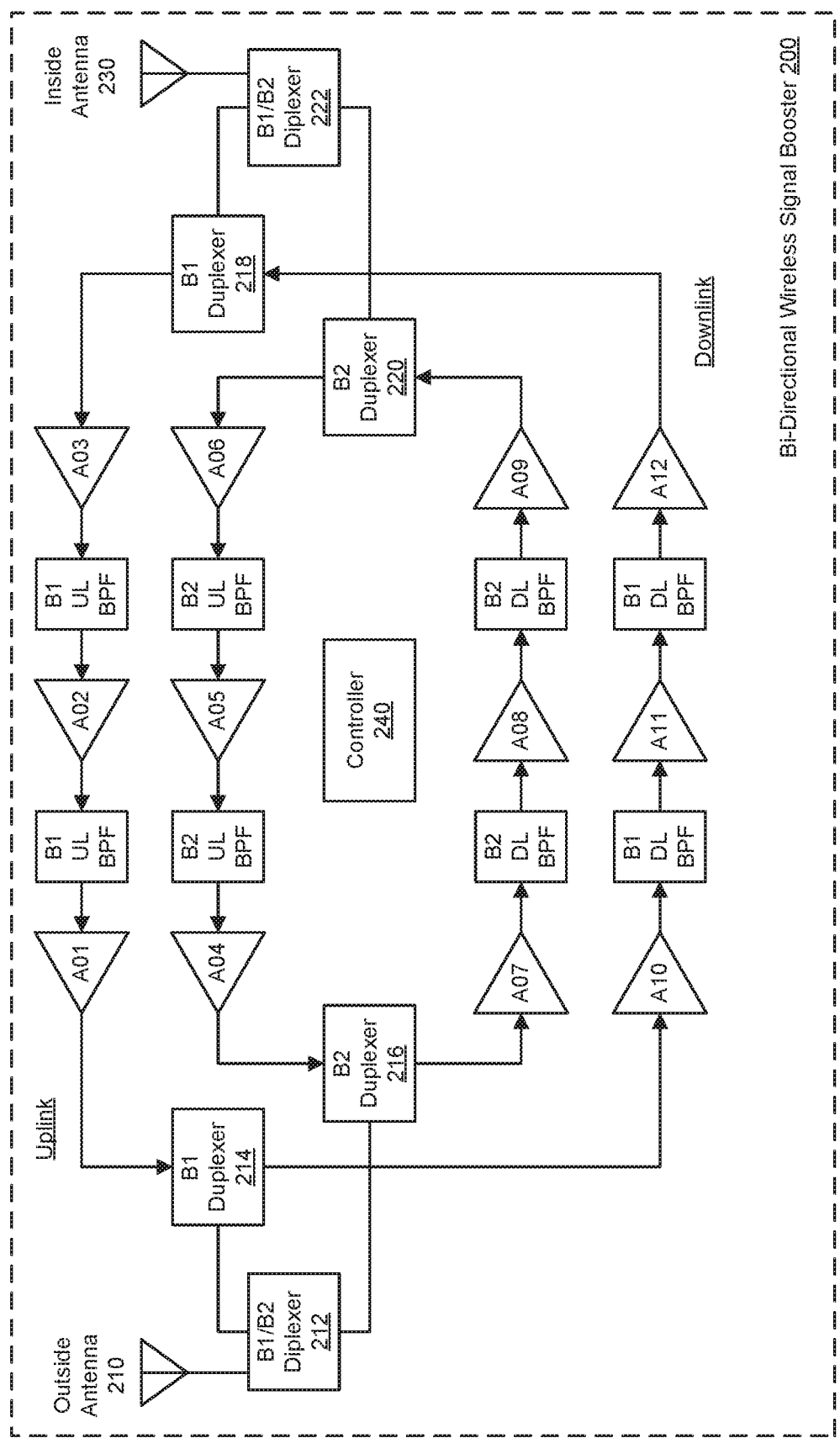
FIG. 2 illustrates a cellular signal booster configured to amplify uplink (UL) and downlink (DL) signals using one or more downlink signal paths and one or more uplink signal paths in accordance with an example.

FIG. 2 illustrates an exemplary bi-directional wireless signal booster 200 configured to amplify uplink (UL) and downlink (DL) signals using a separate signal path for each UL frequency band and DL frequency band and a controller 240. An outside antenna 210, or an integrated node antenna, can receive a downlink signal. For example, the downlink signal can be received from a base station (not shown). The downlink signal can be provided to a first B1/B2 diplexer 212, wherein B1 represents a first frequency band and B2 represents a second frequency band. The first B1/B2 diplexer 212 can create a B1 downlink signal path and a B2 downlink signal path. Therefore, a downlink signal that is associated with B1 can travel along the B1 downlink signal path to a first B1 duplexer 214, or a downlink signal that is associated with B2 can travel along the B2 downlink signal path to a first B2 duplexer 216. After passing the first B1 duplexer 214, the downlink signal can travel through a series of amplifiers (e.g., A10, A11 and A12) and downlink band pass filters (BPF) to a second B1 duplexer 218. Alternatively, after passing the first B2 duplexer 216, the downlink can travel through a series of amplifiers (e.g., A07, A08 and A09) and downlink band pass filters (BFF) to a second B2 duplexer 220. At this point, the downlink signal (B1 or B2) has been amplified and filtered in accordance with the type of amplifiers and BPFs included in the bi-directional wireless signal booster 200. The downlink signals from the second B1 duplexer 218 or the second B2 duplexer 220, respectively, can be provided to a second B1/B2 diplexer 222. The second B1/B2 diplexer 222 can provide an amplified downlink signal to an inside antenna 230, or an integrated device antenna. The inside antenna 230 can communicate the amplified downlink signal to a wireless device (not shown), such as a mobile phone.

In one example, the inside antenna 230 can receive an uplink (UL) signal from the wireless device. The uplink signal can be provided to the second B1/B2 diplexer 222. The second B1/B2 diplexer 222 can create a B1 uplink signal path and a B2 uplink signal path. Therefore, an uplink signal that is associated with B1 can travel along the B1 uplink signal path to the second B1 duplexer 218, or an uplink signal that is associated with B2 can travel along the B2 uplink signal path to the second B2 duplexer 222. After passing the second B1 duplexer 218, the uplink signal can travel through a series of amplifiers (e.g., A01, A02 and A03) and uplink band pass filters (BPF) to the first B1 duplexer 214. Alternatively, after passing the second B2 duplexer 220, the uplink signal can travel through a series of amplifiers (e.g., A04, A05 and A06) and uplink band pass filters (BPF) to the first B2 duplexer 216. At this point, the uplink signal (B1 or B2) has been amplified and filtered in accordance with the type of amplifiers and BFFs included in the bi-directional wireless signal booster 200. The uplink signals from the first B1 duplexer 214 or the first B2 duplexer 216, respectively, can be provided to the first B1/B2 diplexer 212. The first B1/B2 diplexer 212 can provide an amplified uplink signal to the outside antenna 210. The outside antenna can communicate the amplified uplink signal to the base station.

In one example, the bi-directional wireless signal booster 200 can be a 6-band booster. In other words, the bi-directional wireless signal booster 200 can perform amplification and filtering for downlink and uplink signals having a frequency in bands B1, B2, B3 B4, B5 and/or B6.

In one example, the bi-directional wireless signal booster 200 can use the duplexers to separate the uplink and downlink frequency bands, which are then amplified and filtered separately. A multiple-band cellular signal booster can typically have dedicated radio frequency (RF) amplifiers (gain blocks), RF detectors, variable RF attenuators and RF filters for each uplink and downlink band.

Figure 3:
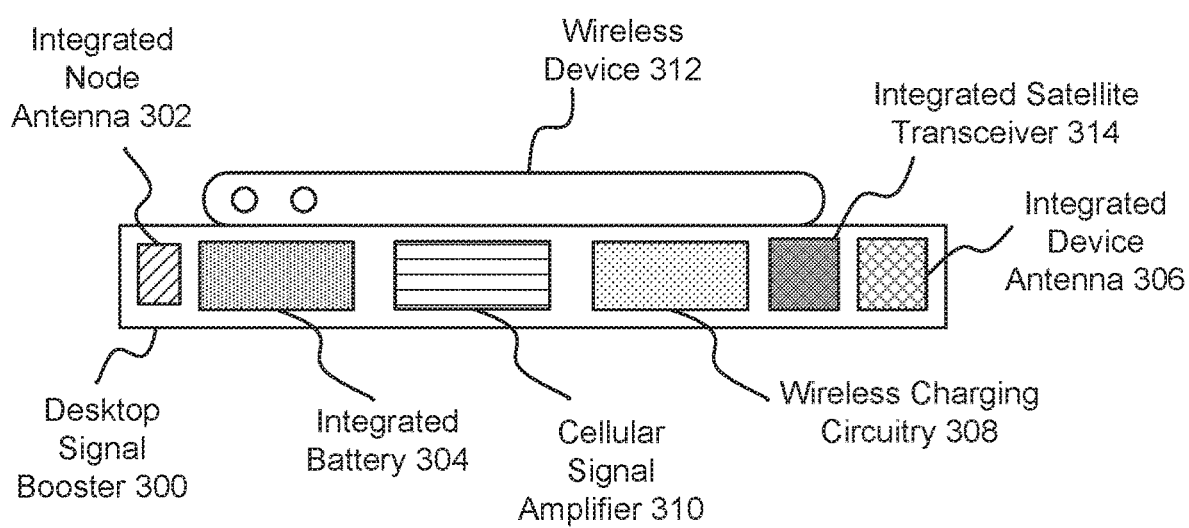
FIG. 3 illustrates a desktop signal booster in accordance with an example.

FIG. 3 illustrates an exemplary configuration of a desktop signal booster 300. The desktop signal booster 300 can include a cellular signal amplifier 310, and the cellular signal amplifier 310 can be configured to amplify signals for a wireless device 312 in proximity to the desktop signal booster 300. For example, the wireless device 312 can be physically coupled to the desktop signal booster 300, the wireless device 312 can be less than 5 centimeters (cm) from the desktop signal booster 300, the wireless device 312 can be less than 20 cm from the desktop signal booster 300, the wireless device 312 can be less than 1 meter from the desktop signal booster 300, etc. The cellular signal amplifier 310 can amplify downlink signals received from a base station (not shown), and then forward the amplified downlink signals to the wireless device 312. Similarly, the cellular signal amplifier 310 can amplify uplink signals received from the wireless device 312, and then forward the amplified uplink signals to the base station. In one example, the cellular signal amplifier 310 can provide up to a 6 decibel (dB) improvement to the signal. In addition, the desktop signal booster 300 can include an integrated satellite transceiver 314 that can communicate signals to one or more satellites.

In one example, the desktop signal booster 300 can include an integrated node antenna 302 for transmitting signals to the base station and receiving signals from the base station. The desktop signal booster 300 can include an integrated battery 304 to provide power to the cellular signal amplifier 310 and/or the wireless device 312, thereby enabling unplugged operation of the desktop signal booster 300. The desktop signal booster 300 can include an integrated device antenna 306 for transmitting signals to the wireless device 312 and receiving signals from the wireless device 312. The desktop signal booster 300 can include wireless charging circuitry configured to wirelessly charge the wireless device 312 when the wireless device 312 is placed in proximity to the desktop signal booster 300. The integrated node antenna 302, the integrated battery 304, the integrated device antenna 306, the wireless charging circuitry 308 and the cellular signal amplifier 310 can be incorporated into the desktop signal booster 300 in a single, portable form-factor.

In addition, the integrated node antenna 302 and the integrated device antenna 306 can be positioned at a selected distance from each other to increase isolation. For example, the integrated node antenna 302 can be placed at a first end of the desktop signal booster 300 and the integrated device antenna 306 can be placed at a second end of the desktop signal booster 300 in order to increase the isolation between the integrated node antenna 302 and the integrated device antenna 306.

In previous solutions, wireless charging docks fail to incorporate an integrated signal booster, and particularly not a Federal Communications Commission (FCC)-compatible consumer signal booster. In contrast, as shown, the desktop signal booster 300 can incorporate the wireless charging circuitry 308 to wirelessly charge the wireless device 312, and the desktop signal booster 300 can be an FCC-compatible consumer signal booster.

In one example, the desktop signal booster 300 can detect and mitigate unintended oscillations in uplink and downlink bands. The desktop signal booster 300 can be configured to automatically power down or cease amplification when the wireless device 312 has approached an affected base station.

In one example, the desktop signal booster 300 can enable a cellular connection, increase data rates and/or increase performance in otherwise poor-connection areas. In order to improve performance, the desktop signal booster 300 can be used in series with a standard signal booster and/or a sleeve that amplifies signals for a wireless device placed in the sleeve.

Typically, mobile devices can have an increased noise figure (e.g., 5-6 dB) when the mobile devices do not use low-noise amplifiers (LNAs) on their radio frequency (RF) front-end receiving paths. However, the handheld booster 300 can lower the noise figure (e.g., to approximately 1-2 dB) by using one or more LNAs.

In one example, the wireless device 312 can be placed in a sleeve that functions to amplify signals for the wireless device 312, and both the wireless device 312 and the sleeve can be placed in proximity to the desktop signal booster 300. In other words, both the desktop signal booster 300 and the sleeve can be utilized to improve performance. In another example, Bluetooth headsets, wired headsets and speaker phones can allow a user to interface with or use the wireless device 312 when the wireless device 312 is placed on the desktop signal booster 300. In yet another example, the desktop signal booster 300 can include a node antenna (not shown), and the node antenna can be extendable (e.g., telescoping) or moveable to improve positioning and/or performance of the desktop signal booster 300. In addition, the desktop signal booster 300 can include arms, a rubber cover or other means for holding the wireless device 312 in position (e.g., on top of the desktop signal booster 300).

In one example, a coaxial cable can run from an outside antenna/booster unit to a dock/charging unit, which can allow for improved positioning for the consumer. The outside antenna/booster unit and the dock/charging unit can connect together or detach as desired. In another example, a consumer can have a 'permanent' outside antenna in a home or office, and a personal desktop booster can be 'docked' upon arrival at that location.

In one configuration, the integrated device antenna 306 can communicate with the wireless device 312 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

Figure 4:
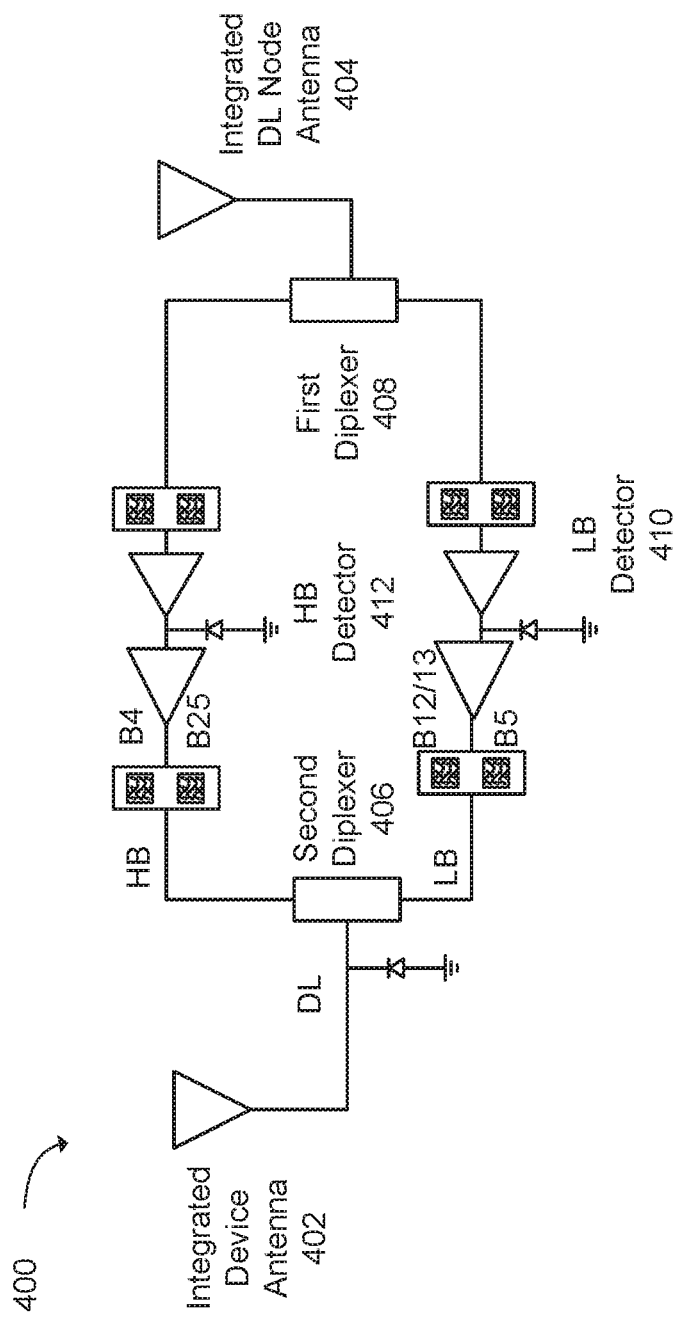
FIG. 4 illustrates a cellular signal amplifier configured to amplify DL signals in accordance with an example.

FIG. 4 illustrates an exemplary cellular signal amplifier 400 configured to amplify downlink (DL) signals. An integrated DL node antenna 404 can receive a DL signal from a base station (not shown). The DL signal can be directed to a first diplexer 408, which can direct the DL signal to a DL high band (HB) signal path or a DL low band (LB) signal path. The DL high band signal path and the DL low band signal path can each include one or more single input single output (SISO) bandpass filters and one or more amplifiers. For the DL high band signal path, the SISO bandpass filter(s) can filter signals in LTE frequency bands 4 and 25. For the DL low band signal path, the SISO bandpass filter(s) can filter signals in LTE frequency bands 5, 12 and 13. The DL signal can be filtered and amplified in either the DL high band signal path or the DL low band signal path. The amplification of the DL signals can be limited to a gain of less than or equal to 9 dB. Then, the DL signal can be passed to a second diplexer 406. The second diplexer 406 can direct the DL signal to an integrated device antenna 402, which can transmit the DL signal to a wireless device (not shown).

In one example, the DL high band signal path can include a HB detector 412. The HB detector 412 can be a diode. The HB detector 412 can detect a DL signal received from the integrated DL node antenna 404 via the first diplexer 408. The HB detector 412 can detect a power level of the DL signal, and when the power level of the DL signal is greater than a selected threshold, the cellular signal amplifier 400 can be turned off. In other words, the DL signal may not need to be amplified, so the cellular signal amplifier 400 can be turned off to conserve power. When the HB detector 412 detects that the power level of the DL signal is less than a selected threshold, the cellular signal amplifier 400 can be turned on. Therefore, the cellular signal amplifier 400 can be engaged or disengaged depending on the power level of the DL signal.

Similarly, the DL low band signal path can include a LB detector 410. The LB detector 410 can be a diode. The LB detector 410 can detect a DL signal received from the integrated DL node antenna 404 via the first diplexer 404. The LB detector 410 can detect a power level of the DL signal, and when the power level of the DL signal is greater than a selected threshold, the cellular signal amplifier 400 can be turned off. When the LB detector 410 detects that the power level of the DL signal is less than a selected threshold, the cellular signal amplifier 400 can be turned on.

In one configuration, the mobile device can include a primary antenna and a secondary antenna. For example, the mobile device can use the secondary antenna when the primary antenna is not working. In addition, when the primary antenna is used for a DL-only signal amplification and filtering path (as shown in FIG. 4), the mobile device can use the secondary antenna to transmit UL signals. In other words, the primary antenna can be used for DL signals, and the secondary antenna can be used for UL signals. In this configuration, the UL signal transmitted from the mobile device may not be amplified by the cellular signal amplifier 400.

In one example, the lack of UL amplification can lead to a less than 9 dB system gain. In another example, the cellular signal amplifier 400 can include a detector that can detect an UL signal, and then determine whether to turn the DL amplification path on or off.

Figure 5:
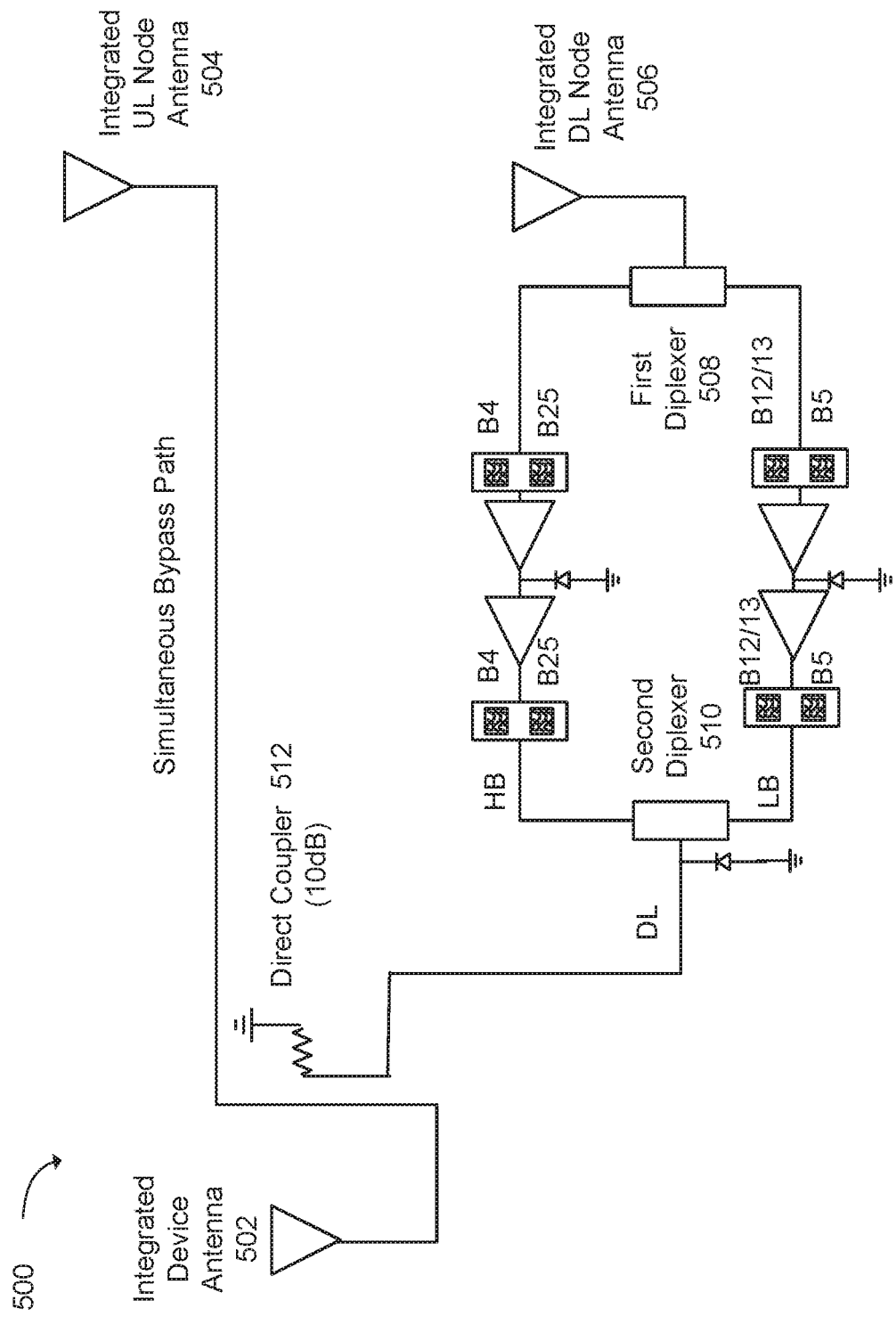
FIG. 5 illustrates a cellular signal amplifier configured with a simultaneous bypass path in accordance with an example.

FIG. 5 illustrates an exemplary cellular signal amplifier 500 configured with a simultaneous bypass path. The cellular signal amplifier 500 can only amplify downlink (DL) signals. The cellular signal amplifier 500 can direct an uplink (UL) signal on a simultaneous bypass path, which enables the UL signal to travel directly from an integrated device antenna 502 to an integrated UL node antenna 504. In other words, the UL signal can avoid a filtering and amplification path. In this case, when the UL signal is not amplified, the integrated device antenna 502 can be directly coupled to the integrated UL node antenna 504. The direct coupling between the integrated device antenna 502 and the integrated UL node antenna 504 can be achieved using a directional coupler. The amplification of the UL signal can account for signal loss due to the directional coupler 512. In addition, by not amplifying the UL signal, a lower specific absorption rate (SAR) level can be achieved.

In one example, a DL signal can be received via an integrated DL node antenna 506. The DL signal can be directed to a first diplexer 508. The DL signal can be directed to a high band DL signal amplification path or a low band DL signal amplification path, and then to a second diplexer 510. The DL signal can travel from the second diplexer 510 to the integrated device antenna 502 for transmission to a wireless device (not shown).

In one configuration, the cellular signal amplifier 500 can receive DL signals and transmit UL signals with a single integrated node antenna. In other words, the integrated UL node antenna 504 and the integrated DL node antenna 506 can be combined to form the single integrated node antenna.

In one configuration, the cellular signal amplifier 500 can include the integrated device antenna 502 and an integrated UL/DL node antenna. The integrated device antenna 502 and the integrated UL/DL node antenna can be connected via a simultaneous bypass path, which bypasses the amplification and signaling paths. As an example, an UL signal from the integrated device antenna 502 can be passed to the integrated UL/DL node antenna via the simultaneous bypass path. As another example, a DL signal from the integrated UL/DL node antenna can be passed to the integrated device antenna 502 via the simultaneous bypass path.

In one example, the FCC can limit the cellular signal amplifier 500 to a less than 9 dB system gain because the cellular signal amplifier 500 does not perform UL amplification. In another example, the cellular signal amplifier 500 can include a detector that can detect an UL signal, and then determine whether to turn the DL amplification path on or off. In yet another example, the cellular signal amplifier 500 can include an additional low noise amplifier (LNA) to reduce the noise figure.

Figure 6:
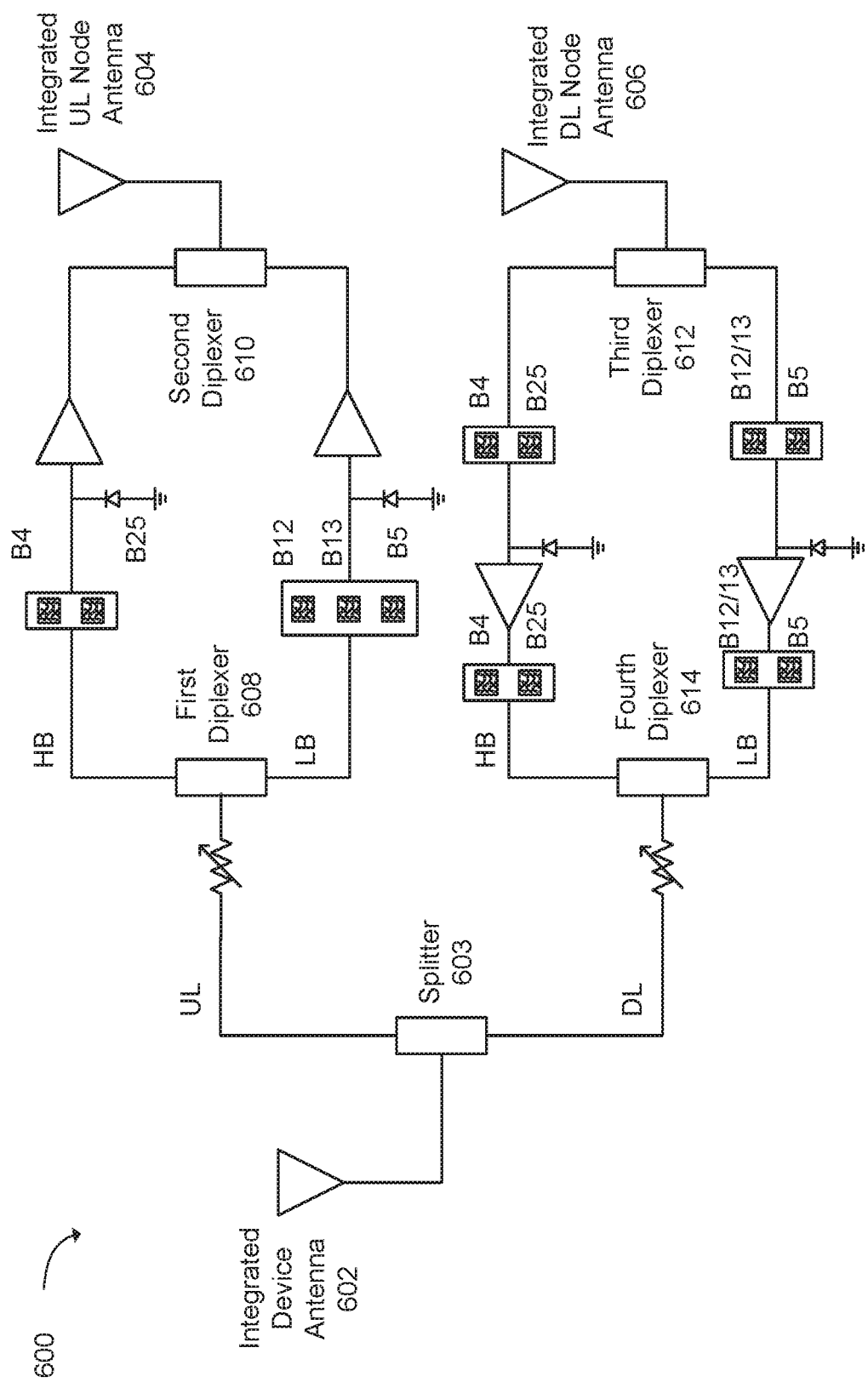
FIG. 6 illustrates a cellular signal amplifier configured to amplify uplink (UL) and downlink (DL) signals in accordance with an example.

FIG. 6 illustrates an exemplary cellular signal amplifier 600 configured to amplify uplink (UL) and downlink (DL) signals. The cellular signal amplifier 600 can include an integrated device antenna 602, an integrated UL node antenna 604 and an integrated DL node antenna 606. In one example, the amplification of UL and DL signals can be limited to a gain of less than or equal to 23 dB. A separate cellular signal amplifier or separate antenna for UL and DL communications can increase the UL or DL signal output power by eliminating the need for filtering on a power amplifier output.

In one example, the integrated device antenna 602 can receive an UL signal from a wireless device (not shown). The UL signal can be directed to a splitter 603, and then the UL signal can be directed to first diplexer 608. The first diplexer 608 can direct the UL signal to an UL high band signal path or a UL low band signal path (depending on whether the UL signal is a high band signal or a low band signal). The UL high band signal path and the UL low band signal path can each include a single input single output (SISO) bandpass filter. For the UL high band signal path, the SISO bandpass filter can filter signals in LTE frequency bands 4 and 25. For the UL low band signal path, the SISO bandpass filter can filter signals in LTE frequency bands 5, 12 and 13. The first diplexer 608 can appropriately direct the UL signal to the high band signal path or the low band signal path, in which the UL signal can be filtered and amplified using a low-noise amplifier (LNA). The filtered and amplified UL signal can be passed to a second diplexer 610, and then to the integrated UL node antenna 604, which can transmit the UL signal to a base station (not shown).

In one example, the integrated DL node antenna 606 can receive a DL signal from the base station. The DL signal can be directed to a third diplexer 612, which can direct the DL signal to a DL high band signal path or a DL low band signal path. The DL high band signal path and the DL low band signal path can each include a single input single output (SISO) bandpass filter. For the DL high band signal path, the SISO bandpass filter can filter signals in LTE frequency bands 4 and 25. For the DL low band signal path, the SISO bandpass filter can filter signals in LTE frequency bands 5, 12 and 13. The DL signal can be filtered and amplified in either the DL high band signal path or the DL low band signal path, and then the DL signal can be passed to a fourth diplexer 614. The fourth diplexer 614 can direct the DL signal to the splitter 603, and then to the integrated device antenna 602, which can transmit the DL signal to the wireless device. In one example, an attenuator can be positioned between the integrated device antenna 602 and the splitter 603 to reduce reflections.

In one configuration, separate UL and DL integrated device antennas can be used to avoid splitter or duplexer (front-end) losses. By using separate UL and DL integrated device antennas, UL output power and DL sensitivity can be increased.

Figure 7:
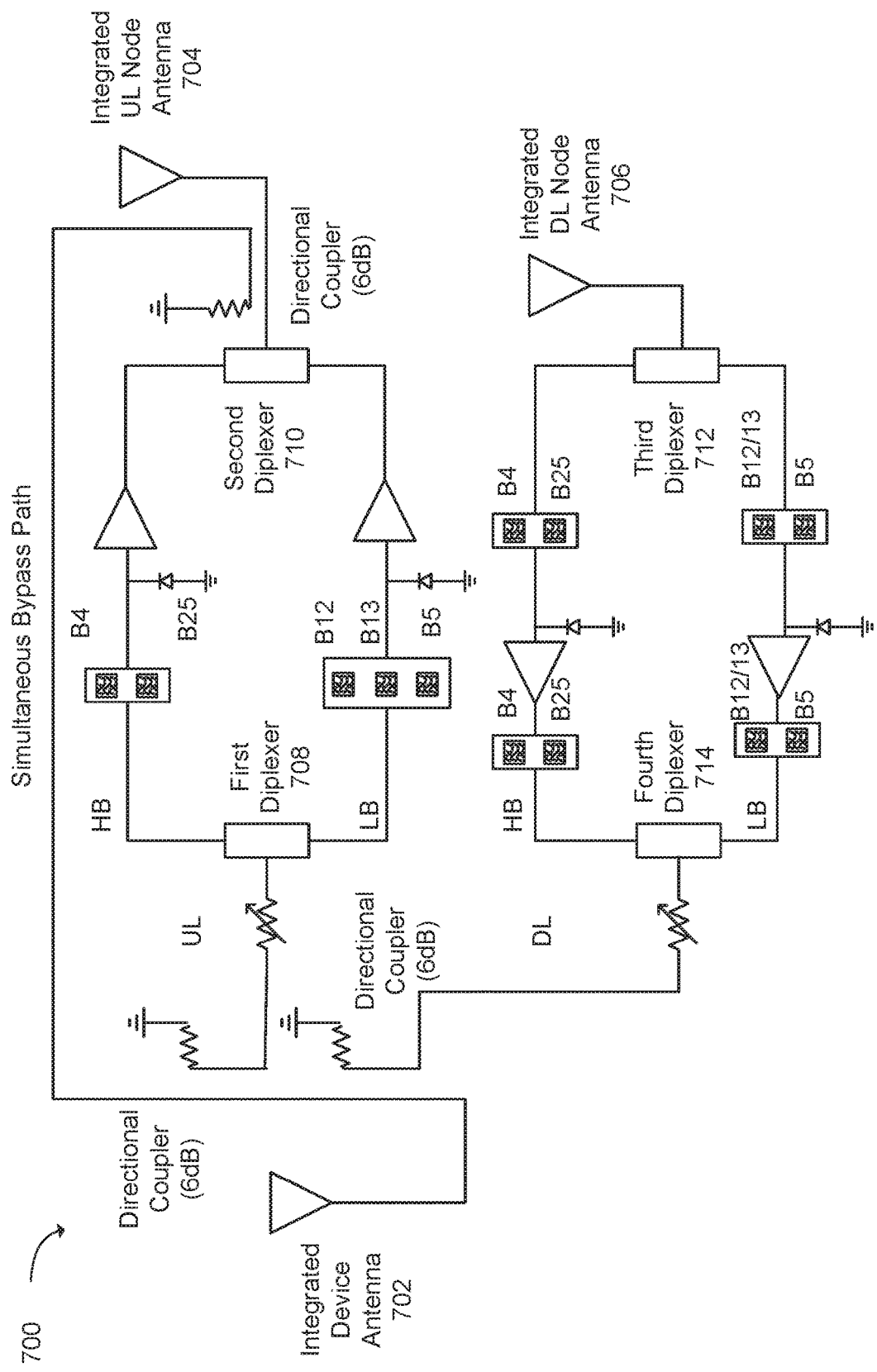
FIG. 7 illustrates a cellular signal amplifier configured with a simultaneous bypass path in accordance with an example.

FIG. 7 illustrates an exemplary cellular signal amplifier 700 configured with a simultaneous bypass path. The cellular signal amplifier 700 can amplify downlink (DL) and uplink (UL) signals. However, the cellular signal amplifier 700 can amplify either DL or UL signals at a given time and allow UL non-amplified signals to simultaneously bypass amplification. In other words, the cellular signal amplifier 700 can detect a power level of an UL signal. The power level of the UL signal can be detected using a detector (e.g., a diode). Based on a signal power level in relation to a defined threshold, the cellular signal amplifier 700 can determine that the UL signal does not need amplification and can bypass either a high band or low band uplink signal amplification path. For example, when the signal power level is above the defined threshold, the UL signal can bypass the high band or low band uplink signal amplification path. On the other hand, when the signal power level is below the defined threshold, the UL signal can be directed to one of the high band or low band uplink signal amplification path. In one example, DL signals can always be directed to a high band or low band downlink signal amplification path of the cellular signal amplifier 700.

In one example, when the UL signal is not amplified, an integrated device antenna 702 can be directly coupled to an integrated UL node antenna 704. In other words, the UL signal can be directed sent from the integrated device antenna 702 to the integrated UL node antenna 704. The direct coupling between the integrated device antenna 702 and the integrated UL node antenna 704 can be achieved using a directional coupler.

Alternatively, the integrated device antenna 702 can be coupled with the integrated UL node antenna 704 using a splitter, a circulator, a triplexer, a quadplexer, a multiplexer, or a duplexer.

In one example, the integrated device antenna 702 can receive an UL signal from a wireless device (not shown). Signal detectors can detect a power level of the UL signal. When the power level is above the defined threshold, one or more directional couplers can be configured such that the UL signal passes directly to the integrated UL node antenna 704 via the simultaneous bypass path. As a result, the UL signal can avoid passing through the high band UL signal amplification path or the low band UL signal amplification path. The integrated UL node antenna 704 can transmit the unamplified UL signal to a base station (not shown).

On the other hand, when the signal detectors detect that the power level of the UL signal is less than the defined threshold, the one or more directional couplers can be configured such that the UL signal is directed to a first diplexer 708. The first diplexer 708 can direct the UL signal to either the high band UL signal amplification path or the low band UL signal amplification path, which causes the UL signal to be filtered and amplified. The UL signal can pass through a second diplexer 710, and then to the integrated UL node antenna 704 for transmission to the base station. In this example, based on the power level of the UL signal, the UL signal does not travel through the simultaneous bypass path.

In one example, a DL signal can be received via an integrated DL node antenna 706. The DL signal can be directed to a third diplexer 712. The DL signal can be directed to a high band DL signal amplification path or a low band DL signal amplification path, and then to a fourth diplexer 714. The DL signal can travel from the fourth diplexer 714 to the integrated device antenna 702 for transmission to the wireless device.

In one example, the simultaneous bypass path can increase battery life of the cellular signal amplifier 700 by allowing UL amplification to be turned off. Further, the simultaneous bypass path can increase reliability, in the event the cellular signal amplifier malfunctions. In one example, the simultaneous bypass path can be always active. The simultaneous bypass path can operate independently of whether or not the cellular signal amplifier 700 has failed. The simultaneous bypass path can operate independent of relays or switches to bypass the cellular signal amplifier 700. Additionally, because wireless propagation paths of signals from multiple antennas can constantly vary, fading margins can exceed 15 dB. Therefore, by using multiple antennas, the reliability of the cellular signal amplifier 700 can be increased.

Figure 8:
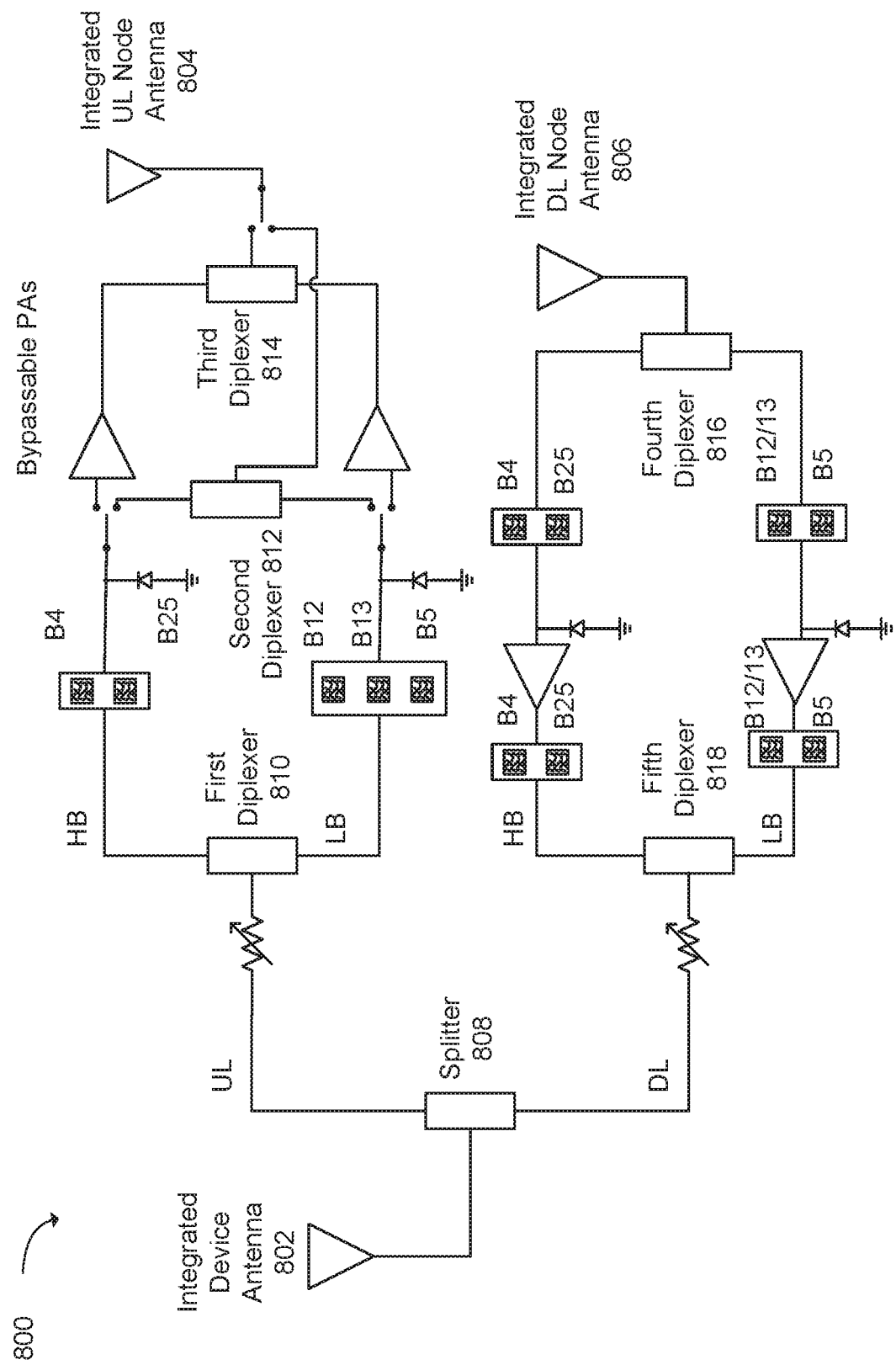
FIG. 8 illustrates a cellular signal amplifier with bypassable power amplifiers in accordance with an example.

FIG. 8 illustrates an exemplary cellular signal amplifier 800 with bypassable power amplifiers. An integrated device antenna 802 can receive an uplink (UL) signal, which can be directed to a splitter 804, and then to a first diplexer 810. The first diplexer 810 can direct the UL signal to a high band UL path or a low band UL path. The high band UL path and the low band UL path can each include a bypassable power amplifier. In one example, when the bypassable power amplifiers are switched off (e.g., to save power), the UL signal from the high band UL path or the low band UL path can travel to a second diplexer 812, then to a third diplexer 814, and then to an integrated UL node antenna 804. In this example, the UL signal is not amplified to save power. In addition, the high band UL path and the low band UL path can each include a signal detector, which can detect a power level of the UL signal. When the power level of the UL signal is above a defined threshold, the UL signal may not be amplified.

In another example, when the bypassable power amplifiers are switched on, the UL signal from the high band UL path or the low band UL path can be directed to a respective power amplifier, and then to the third diplexer 814. The UL signal can travel from the third diplexer 814 to the integrated UL node antenna 804. In this example, the UL signal can be amplified prior to transmission from the integrated UL node antenna 804.

In one example, an integrated DL node antenna 806 can direct a DL signal to a fourth diplexer 816. The fourth diplexer 816 can direct the DL signal to a high band DL signal amplification and filtering path, or to a low band DL signal amplification and filtering path. A fifth diplexer 818 can direct the DL signal to the splitter 808, which can direct the signal to the integrated device antenna 802.

Figure 9:
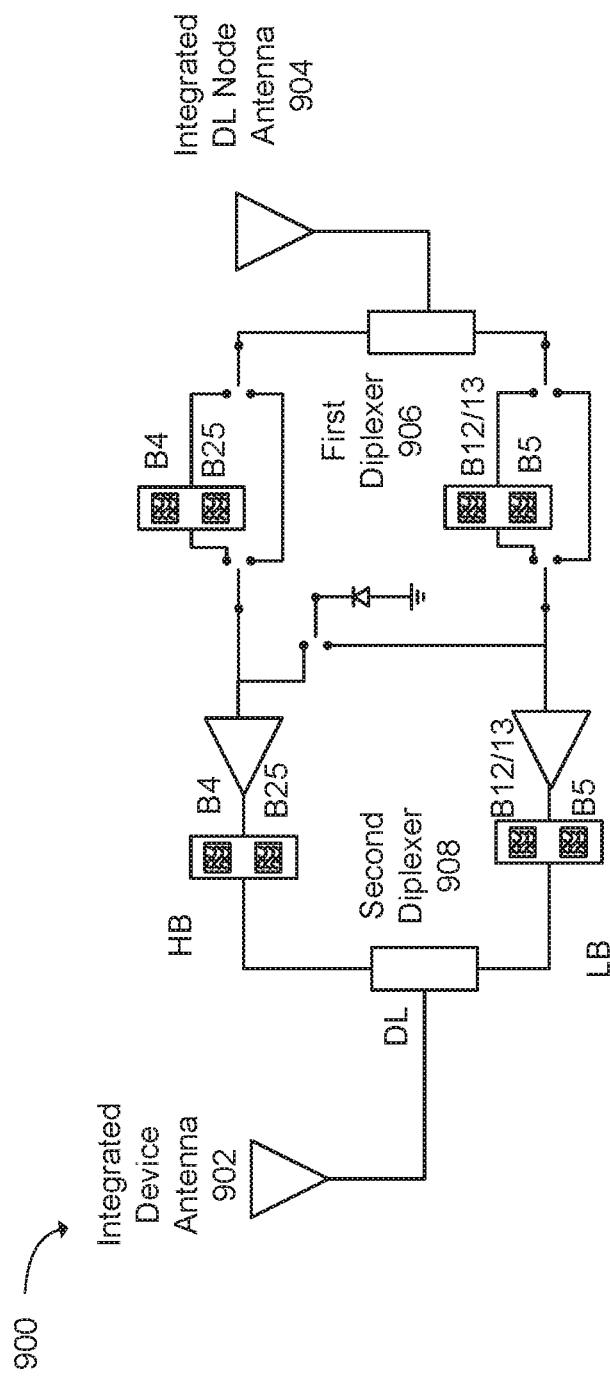
FIG. 9 illustrates a cellular signal amplifier configured with switchable band pass filters (BPFs) in accordance with an example.

FIG. 9 illustrates an exemplary cellular signal amplifier 900 configured with switchable band pass filters (BPFs). Front end BPFs can be switched in when a weak downlink (DL) DL signal is detected or switched out when a strong DL signal is detected. An example of a weak DL signal can be a signal with a signal strength less than −80 dBm while a strong DL signal can be a signal with a signal strength greater than −80 dBm. The minimization of noise figure can be critical in weak signal areas, and the noise figure can be reduced and the coverage extended when the front-end BPFs are switched off. In addition, the switchable BPFs can function to extend a receive sensitivity of the cellular signal amplifier 900.

In one example, an integrated DL node antenna 904 can receive a DL signal, and the DL signal can be provided to a first diplexer 906. The first diplexer 906 can direct the DL signal to a high band signal amplification and filtering path, or the DL signal can be directed to a low band signal amplification and filtering path. The high band path and the low band path can each include switchable BPFs, which enable the DL signal to avoid passing through at least some of the BPFs. The DL signal can be directed to a second diplexer 908, and then to an integrated device antenna 902.

Figure 10:
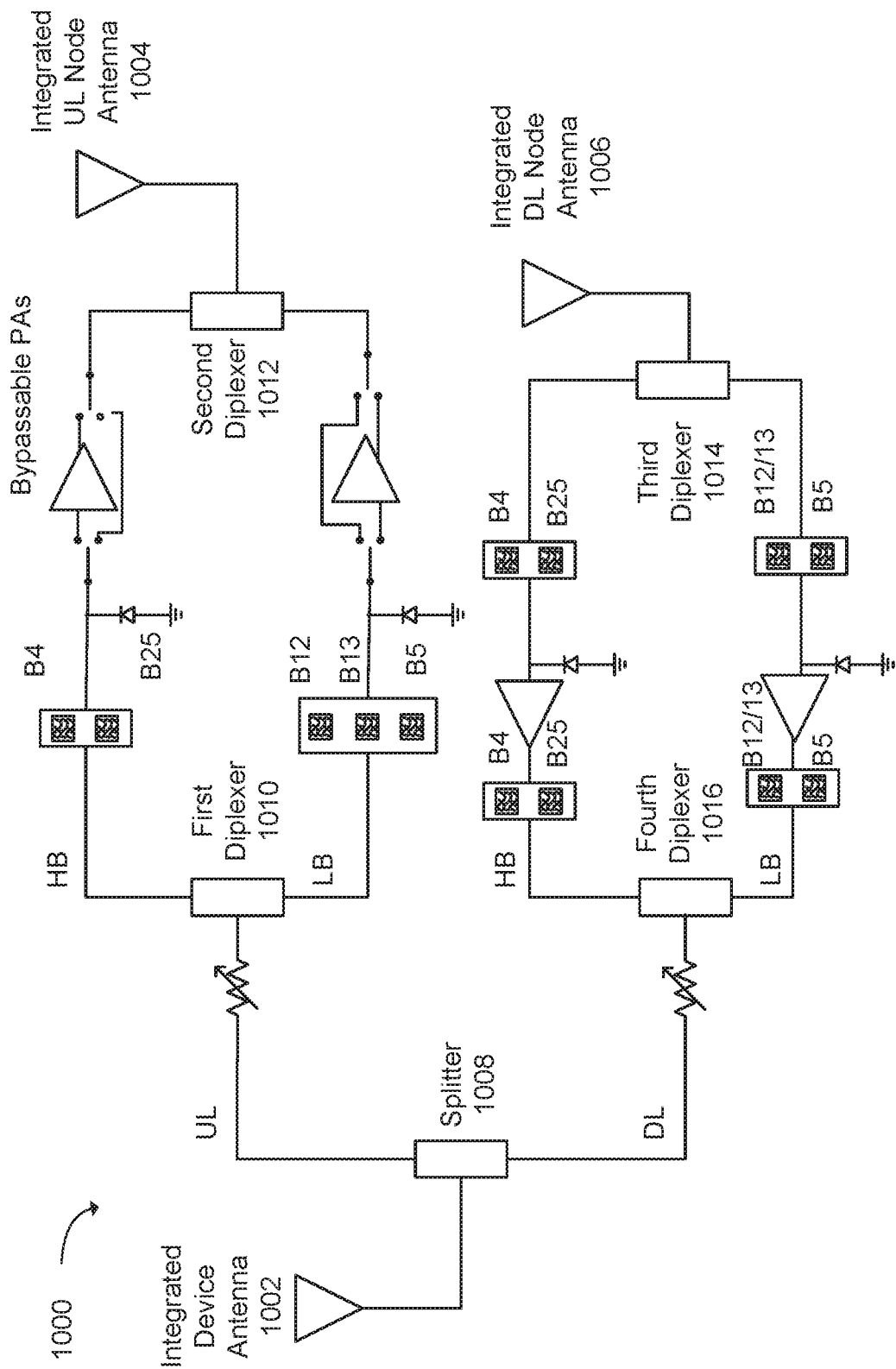
FIG. 10 illustrates a cellular signal amplifier with bypassable power amplifiers in accordance with an example.

FIG. 10 illustrates an exemplary cellular signal amplifier 1000 with bypassable power amplifiers. The power amplifiers can be switched on when an uplink (UL) signal needs to be amplified to reach a base station or switched off and bypassed when a UL signal does not need to be amplified to reach a base station. In one example, the power amplifiers can be switched on when a power level of the UL signal is below a defined threshold, and the power amplifiers can be switched off when the power level of the UL signal is above the defined threshold.

In one example, an integrated device antenna 1002 can receive an UL signal. The UL signal can be directed to a splitter 1008, and then to a first diplexer 1010. The first diplexer 1010 can direct the UL signal to a high band signal amplification and filtering path or a low band signal amplification and filtering path. Each of the high band and low band paths can include a switchable power amplifier. Depending on the power level of the UL signal in relation to the defined threshold, the UL signal can be provided to the power amplifier or bypass the power amplifier to save power. The UL signal can be provided to a second diplexer 1012, and then to an integrated UL node antenna 1004.

In one example, an integrated DL node antenna 1006 can direct a DL signal to a third diplexer 1014. The third diplexer 1014 can direct the DL signal to a high band DL signal amplification and filtering path, or to a low band DL signal amplification and filtering path. A fourth diplexer 1016 can direct the DL signal to the splitter 1008, which can direct the signal to the integrated device antenna 1002.

Figure 11:
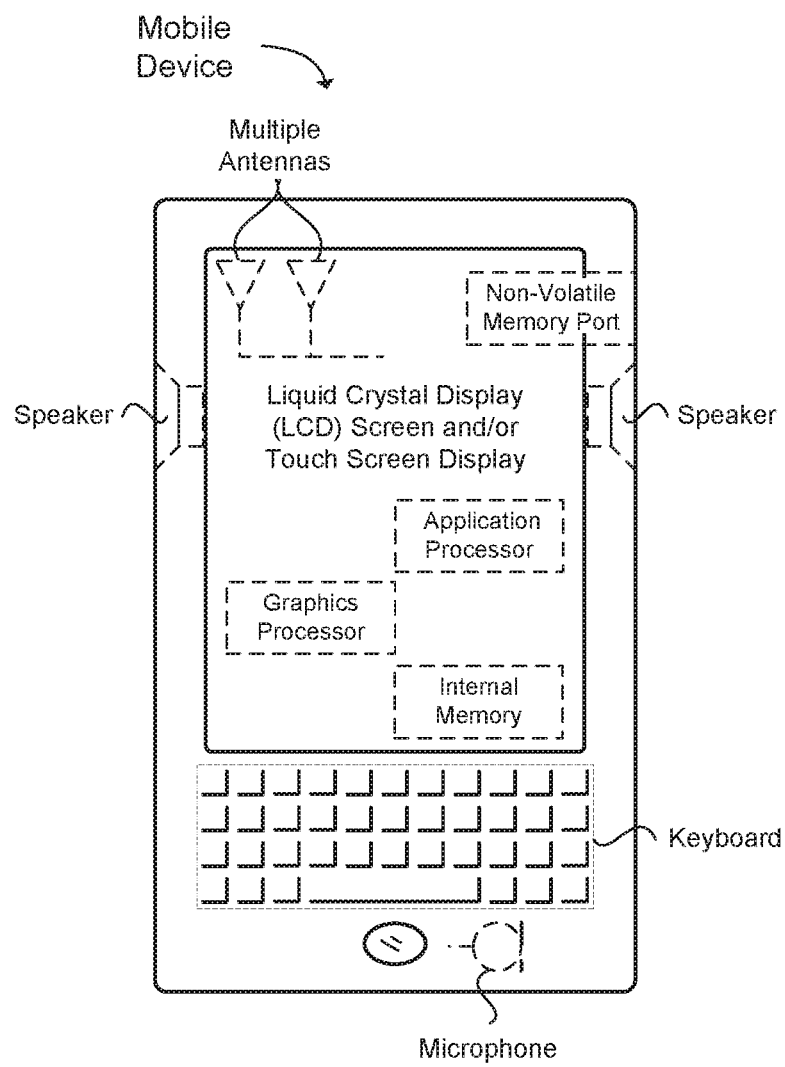
FIG. 11 illustrates a wireless device in accordance with an example.

FIG. 11 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a desktop signal booster, comprising: a cellular signal amplifier configured to amplify signals for a wireless device, wherein the wireless device is within a selected distance from the desktop signal booster; an integrated device antenna coupled to the cellular signal amplifier, wherein the integrated device antenna is configured to transmit signals from the cellular signal amplifier to the wireless device; an integrated node antenna coupled to the cellular signal amplifier, wherein the integrated node antenna is configured to transmit signals from the cellular signal amplifier to a base station; and wireless charging circuitry configured to wirelessly charge the wireless device when the wireless device is placed in proximity to the desktop signal booster.

Example 2 includes the desktop signal booster of Example 1, wherein the desktop signal booster is configured to operate in series with one or more additional devices, wherein the additional devices include at least one of: a non-portable signal booster, or a sleeve that amplifies signals for a wireless device placed in the sleeve.

Example 3 includes the desktop signal booster of any of Examples 1 to 2, wherein a spacing between the integrated device antenna and the integrated node antenna is selected to increase isolation between the integrated device antenna and the integrated node antenna.

Example 4 includes the desktop signal booster of any of Examples 1 to 3, wherein the cellular signal amplifier further comprises one or more amplification and filtering signal paths configured to be positioned between the integrated device antenna and the integrated node antenna, wherein the amplification and filtering signal paths are configured to amplify and filter signals for communication to the base station via the integrated node antenna or for communication to the wireless device via the integrated device antenna.

Example 5 includes the desktop signal booster of any of Examples 1 to 4, wherein the cellular signal amplifier further comprises a bypass signal path configured to be positioned between the integrated device antenna and the integrated node antenna, wherein the bypass signal path does not amplify and filter signals traveling through the bypass signal path, wherein signals are directed to one of the amplification and filtering signal paths or the bypass signal path depending on a power level of the signals in relation to a defined power level threshold.

Example 6 includes the desktop signal booster of any of Examples 1 to 5, wherein the cellular signal amplifier further comprises one or more detectors configured to detect the power levels of the signals.

Example 7 includes the desktop signal booster of any of Examples 1 to 6, wherein the cellular signal amplifier further comprises one or more directional couplers used to form the amplification and filtering signal paths and the bypass signal path.

Example 8 includes the desktop signal booster of any of Examples 1 to 7, wherein: signals are directed to one of the amplification and filtering signal paths when power levels of the signals are below the defined power level threshold; and signals are directed to the bypass signal path when power levels of the signals are above the defined power level threshold.

Example 9 includes the desktop signal booster of any of Examples 1 to 8, wherein the amplification and filtering signal paths includes a high band amplification and filtering signal path operable to direct signals within high frequency bands, wherein the high frequency bands includes band 4 (B4) and band 25 (B25).

Example 10 includes the desktop signal booster of any of Examples 1 to 9, wherein the amplification and filtering signal paths includes a low band amplification and filtering signal path operable to direct signals within low frequency bands, wherein the low frequency bands includes band 5 (B5), band 12 (B12) and band 13 (B13).

Example 11 includes a wireless device charging station, comprising: an integrated device antenna configured to communicate signals with a wireless device; an integrated node antenna configured to communicate signals with a base station; and a cellular signal amplifier that includes one or more amplification and filtering signal paths, wherein the amplification and filtering signal paths are configured to amplify and filter signals for communication to the base station via the integrated node antenna or for communication to the wireless device via the integrated device antenna; and wireless charging circuitry operable to wirelessly charge the wireless device when the wireless device is placed in proximity to the wireless device charging station.

Example 12 includes the wireless device charging station of Example 11, further comprising a battery configured to provide power to the cellular signal amplifier and the wireless device.

Example 13 includes the wireless device charging station of any of Examples 11 to 12, wherein: the cellular signal amplifier further includes one or more detectors configured to detect power levels of the signals; and the one or more amplification and filtering signal paths include one or more bypassable amplifiers and one or more switchable band pass filters that are configurable depending on detected power levels of the signals.

Example 14 includes the wireless device charging station of any of Examples 11 to 13, wherein: the signals bypass the amplifiers to conserve energy when the power levels of the signals are above a defined power level threshold; or the signals do not bypass the amplifiers when the power levels are below a defined power level threshold.

Example 15 includes the wireless device charging station of any of Examples 11 to 14, wherein: the band pass filters are switched in when the power levels of the signals are below a defined power level threshold; or the band pass filters are switched out when the power levels of the signals are above the defined power level threshold.

Example 16 includes the wireless device charging station of any of Examples 11 to 15, wherein the band pass filters are switched out to reduce a noise figure of the cellular signal amplifier and extend a coverage area of the cellular signal amplifier.

Example 17 includes the wireless device charging station of any of Examples 11 to 16, wherein the switchable band pass filters correspond to high frequency bands or low frequency bands, wherein the high frequency bands include band 4 (B4) and band 25 (B25), and the low frequency bands include band 5 (B5), band 12 (B12) and band 13 (B13).

Example 18 includes the wireless device charging station of any of Examples 11 to 17, wherein the one or more amplification and filtering signal paths include one or more downlink (DL) amplification and filtering signal paths and one or more uplink (UL) amplification and filtering signal paths.

Example 19 includes a desktop signal repeater, comprising: a cellular signal amplifier configured to amplify signals for a wireless device; an integrated device antenna configured to transmit signals from the cellular signal amplifier to the wireless device; an integrated node antenna configured to transmit signals from the cellular signal amplifier to a base station; and an integrated satellite transceiver coupled to the cellular signal amplifier and configured to communicate signals to one or more satellites.

Example 20 includes the desktop signal repeater of Example 19, wherein the desktop signal repeater is configured to operate in series with one or more additional devices, wherein the additional devices include at least one of: a non-portable signal booster, or a sleeve that amplifies signals for a wireless device placed in the sleeve.

Example 21 includes the desktop signal repeater of any of Examples 19 to 20, wherein the integrated satellite transceiver is switched on when cellular signals are unavailable.

Example 22 includes the desktop signal repeater of any of Examples 19 to 21, wherein the cellular signal amplifier is a Federal Communications Commission (FCC)-compatible consumer signal booster.

Example 23 includes the desktop signal repeater of any of Examples 19 to 22, wherein the cellular signal amplifier is configured to boost signals in up to seven bands.

Example 24 includes a signal booster, comprising: a cellular signal amplifier configured to amplify signals for a wireless device, wherein the cellular signal amplifier further comprises a bypass signal path that does not amplify and filter signals traveling through the bypass signal path, wherein signals are directed to an amplification and filtering signal path or the bypass signal path depending on a power level of the signals in relation to a defined power level threshold.

Example 25 includes the signal booster of Example 24, further comprising: an integrated device antenna configured to transmit signals from the cellular signal amplifier to the wireless device; and an integrated node antenna configured to transmit signals from the cellular signal amplifier to a base station.

Example 26 includes the signal booster of any of Examples 24 to 25, wherein the cellular signal amplifier is coupled to the integrated device antenna using a directional coupler.

Example 27 the signal booster of any of Examples 24 to 25, wherein the signal booster is a desktop signal booster.

Example 28 includes the signal booster of any of Examples 24 to 27, wherein the cellular signal amplifier further comprises one or more detectors configured to detect the power levels of the signals.

Example 29 includes the signal booster of any of Examples 24 to 28, wherein the cellular signal amplifier further comprises one or more directional couplers used to form the amplification and filtering signal paths and the bypass signal path.

Example 30 includes the signal booster of any of Examples 24 to 29, wherein: signals are directed to one of the amplification and filtering signal paths when power levels of the signals are below the defined power level threshold; and signals are directed to the bypass signal path when power levels of the signals are above the defined power level threshold.

Example 31 includes a signal repeater, comprising: a cellular signal amplifier configured to amplify signals for a wireless device; and an integrated satellite transceiver coupled to the cellular signal amplifier and configured to communicate signals to one or more satellites.

Example 32 includes the signal repeater of Example 31, wherein the signal repeater is a desktop signal repeater.

Example 33 includes the signal repeater of any of Examples 31 to 32, further comprising: an integrated device antenna configured to transmit signals from the cellular signal amplifier to the wireless device; and an integrated node antenna configured to transmit signals from the cellular signal amplifier to a base station.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A signal repeater, comprising:
  a cellular signal amplifier configured to amplify signals for a wireless device;
  an integrated device antenna configured to transmit signals from the cellular signal amplifier to the wireless device;
  an integrated node antenna configured to transmit signals from the cellular signal amplifier to a base station; and
  an integrated satellite transceiver coupled to the cellular signal amplifier and configured to communicate signals to one or more satellites.

2. The signal repeater of claim 1, wherein the signal repeater is configured to operate in series with one or more additional devices, wherein the additional devices include at least one of: a non-portable signal booster, or a sleeve that amplifies signals for a wireless device placed in the sleeve.

3. The signal repeater of claim 1, wherein the integrated satellite transceiver is used when cellular signals are unavailable.

4. The signal repeater of claim 1, wherein the cellular signal amplifier is a Federal Communications Commission (FCC)-compatible consumer signal booster.

5. The signal repeater of claim 1, wherein the cellular signal amplifier is configured to boost signals in up to seven bands.

6. A signal repeater, comprising:
  a cellular signal amplifier configured to amplify signals for a wireless device; and
  an integrated satellite transceiver coupled to the cellular signal amplifier and configured to communicate signals to one or more satellites,
  wherein the integrated satellite transceiver is used when cellular signals are unavailable.

7. The signal repeater of claim 6, wherein the signal repeater is a desktop signal repeater.

8. The signal repeater of claim 6, further comprising:
  an integrated device antenna configured to transmit signals from the cellular signal amplifier to the wireless device; or
  an integrated node antenna configured to transmit signals from the cellular signal amplifier to a base station.

9. The signal repeater of claim 8, wherein the cellular signal amplifier further comprises one or more amplification and filtering signal paths configured to be positioned between the integrated device antenna and the integrated node antenna.

10. The signal repeater of claim 9, wherein the amplification and filtering signal paths are configured to amplify and filter signals for communication to the base station via the integrated node antenna or for communication to the wireless device via the integrated device antenna.

11. The signal repeater of claim 9, wherein the amplification and filtering signal paths are configured to amplify and filter signals for communication to the one or more satellites via the integrated satellite transceiver coupled to the cellular signal amplifier.

12. The signal repeater of claim 9, wherein the cellular signal amplifier further comprises a bypass signal path configured to be positioned between the integrated device antenna and the integrated node antenna.

13. The signal repeater of claim 12, wherein the bypass signal path does not amplify and filter signals traveling through the bypass signal path, wherein signals are directed to one of the amplification and filtering signal paths or the bypass signal path depending on a power level of the signals in relation to a defined power level threshold.

14. The signal repeater of claim 6, wherein the cellular signal amplifier is a Federal Communications Commission (FCC)-compatible consumer signal amplifier.

15. The signal repeater of claim 6, wherein the cellular signal amplifier is configured to boost signals in up to seven bands.

16. A signal repeater, comprising:
  a cellular signal amplifier configured to amplify signals for a wireless device;
  an integrated device antenna configured to transmit signals from the cellular signal amplifier to the wireless device;
  an integrated node antenna configured to transmit signals from the cellular signal amplifier to a base station; and
  an integrated satellite transceiver coupled to the cellular signal amplifier and configured to communicate signals to one or more satellites,
  wherein the integrated satellite transceiver is used when cellular signals are unavailable.

17. The signal repeater of claim 16, wherein the signal repeater is configured to operate in series with one or more additional devices, wherein the additional devices include at least one of: a non-portable signal booster, or a sleeve that amplifies signals for a wireless device placed in the sleeve.

18. The signal booster of claim 16, wherein the cellular signal amplifier further comprises one or more detectors configured to detect power levels of the signals.

19. The signal repeater of claim 16, further comprising wireless charging circuitry configured to wirelessly charge the wireless device when the wireless device is placed in proximity to the signal booster.

20. The signal booster of claim 16, wherein a spacing between the integrated device antenna and the integrated node antenna is selected to increase isolation between the integrated device antenna and the integrated node antenna.

* * * * *